US012781674B2

(12) United States Patent
Bando et al.

(10) Patent No.: US 12,781,674 B2
(45) Date of Patent: Nov. 3, 2026

(54) CONTROL SYSTEM FOR ENGINE

(71) Applicant: Mazda Motor Corporation, Aki-gun (JP)

(72) Inventors: Naoki Bando, Aki-gun (JP); Yusuke Kuroiwa, Aki-gun (JP); Takahiro Kawamura, Aki-gun (JP); Atsushi Ohshita, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 0 days.

(21) Appl. No.: 19/280,562

(22) Filed: Jul. 25, 2025

(65) Prior Publication Data

US 2026/0043366 A1 Feb. 12, 2026

(30) Foreign Application Priority Data

Aug. 9, 2024 (JP) ................................ 2024-134484

(51) Int. Cl.
*F02D 41/00* (2006.01)
*F02D 1/02* (2006.01)

(52) U.S. Cl.
CPC .......... *F02D 41/0005* (2013.01); *F02D 1/02* (2013.01); *F02D 2200/0802* (2013.01); *F02D 2200/602* (2013.01)

(58) Field of Classification Search
CPC .................. F02D 41/0005; F02D 1/02; F02D 2200/0802; F02D 2200/602; F02D 41/0235; F02D 41/18; F02D 2041/0265; F02D 2200/101; F02D 2200/501; F02D 41/123; F01N 2900/08; F01N 2900/10; F01N 3/18; F01N 9/00; F01N 2900/1602
See application file for complete search history.

(56) References Cited

U.S. PATENT DOCUMENTS 6,389,807 B1 * 5/2002 Suzuki ............... F02D 41/0235 60/285
6,892,527 B2 * 5/2005 Ueda .................... F02D 41/123 123/481

(Continued)

FOREIGN PATENT DOCUMENTS

JP 2004132185 A 4/2004

OTHER PUBLICATIONS

European Patent Office, Extended European Search Report Issued in Application No. 25192070.8, Dec. 8, 2025, Germany, 10 pages.

*Primary Examiner* — Sizo B Vilakazi
(74) *Attorney, Agent, or Firm* — Alleman Hall LLP

(57) ABSTRACT

When an accelerator opening degree decreases to be lower than a predetermined accelerator determination opening degree, a control device implements a fuel cut that stops fuel injection by an injector; and in implementation of fuel cut, when a catalyst temperature is high, the control device implements an intake air amount increase control to control an intake air amount adjustment device so that an intake air amount is larger than when a catalyst temperature is low, and in implementation of the intake air amount increase control, when a brake sensor detects that a brake is in operation, the control device controls the intake air amount adjustment device so that the intake air amount becomes larger than when the brake sensor detects that the brake is in non-operation.

18 Claims, 7 Drawing Sheets

(56) References Cited

U.S. PATENT DOCUMENTS

| | | | | |
|---|---|---|---|---|
| 7,290,387 | B2 * | 11/2007 | Yoshioka | F02D 41/123<br>60/285 |
| 7,395,808 | B2 | 7/2008 | Yoshioka | |
| 2005/0274105 | A1 * | 12/2005 | Yoshioka | F02D 41/123<br>60/285 |
| 2007/0266991 | A1 * | 11/2007 | Yoshioka | F02D 31/002<br>123/339.1 |
| 2017/0159584 | A1 * | 6/2017 | Yamashita | F02D 41/0002 |

* cited by examiner

CONTROL SYSTEM FOR ENGINE

TECHNICAL FIELD

The present disclosure relates to a control system for an engine.

BACKGROUND ART

A catalyst device that is provided in an exhaust passage of an engine and purifies exhaust gas deteriorates when exposed to high temperatures. Therefore, in order to maintain good exhaust gas performance of the engine, the catalyst device is required to be prevented from being exposed to excessively high temperatures.

Japanese Patent Laid-Open No. 2004-132185 discloses an engine in which, in order to prevent the catalyst device from overheating, the amount of air drawn into the combustion chamber is increased when a fuel cut stops fuel supply to the combustion chamber, in which a large amount of air is introduced into the exhaust passage and therefore into the catalyst device, and the catalyst device is cooled with the air.

SUMMARY

Technical Problem

A fuel cut is mainly implemented when a driver wants to decelerate a vehicle. On the other hand, if the amount of air drawn into the combustion chamber is increased in the fuel cut, a pumping loss decreases, causing a decrease rate of the engine rotation speed, and therefore a decrease rate of the vehicle speed, to become slower. Therefore, in a configuration in which the amount of air drawn into the combustion chamber in the fuel cut is simply increased as in Japanese Patent Laid-Open No. 2004-132185, there is a problem in which a driver's sense of deceleration worsens.

The present disclosure has been made in consideration of the above circumstances, and an object thereof is to provide a control system for an engine that can prevent a catalyst device from overheating while preventing a sense of deceleration from worsening.

Solution to Problem

A control system for an engine according to the present disclosure is a control system for an engine provided in a vehicle including a brake device for braking a wheel and an accelerator pedal for adjusting vehicle speed, the control system including an engine body including a combustion chamber; an exhaust passage and an intake passage each connected to the engine body; an injector that supplies fuel to the combustion chamber; an intake air amount adjustment device that adjusts an intake air amount that is an amount of air drawn into the combustion chamber; a catalyst device provided in the exhaust passage to purify exhaust gas; an accelerator sensor that detects an accelerator opening degree, the accelerator opening degree being an opening degree of the accelerator pedal; a brake sensor that detects an operation state of the brake device; and a control device that controls the injector and the intake air amount adjustment device. The control device is configured to estimate a catalyst temperature that is a temperature of the catalyst device, implement a fuel cut to stop fuel injection by the injector when the accelerator opening degree detected by the accelerator sensor is less than a predetermined accelerator determination opening degree; in implementation of the fuel cut, implement an intake air amount increase control to control the intake air amount adjustment device when the catalyst temperature is high so that the intake air amount is larger than when a catalyst temperature is low; and in implementation of the intake air amount increase control, control the intake air amount adjustment device when the brake sensor detects that the brake device is in operation so that the intake air amount is larger than when the brake sensor detects that the brake device is not in operation.

In the present disclosure, when the catalyst temperature is high, the intake air amount, that is, the amount of air introduced into the combustion chamber, and therefore the exhaust passage, is increased in the implementation of the fuel cut. Therefore, the catalyst device can be cooled by a large amount of air by using the timing of the fuel cut.

Moreover, in implementation of the fuel cut, when the brake device is in operation, the intake air amount is increased compared to when it is in non-operation. For this reason, when the vehicle can be decelerated by the braking force of the brake device, and thereby a sense of deceleration is ensured, more air can promote a temperature decrease of the catalyst device. Contrarily, when the brake device does not ensure a sense of deceleration, the intake air amount can be made relatively small to increase the pumping loss, thereby ensuring the sense of deceleration. According to the present disclosure, therefore, it is possible to prevent the catalyst device from overheating while preventing the sense of deceleration from worsening.

Preferably, in this configuration, the control device implements the intake air amount increase control when a gear stage of a multi-speed transmission mounted on the vehicle is a high-speed stage that is equal to or greater than a predetermined determination gear stage, and the control device prohibits the intake air amount increase control when the gear stage is a low-speed stage that is lower than the determination gear stage.

When the fuel cut accompanied by the intake air amount increase control ends and the fuel supply is resumed, the increase amount of the engine torque is likely to be large due to a large amount of air in the combustion chamber. Here, the influence of the engine torque fluctuations on the wheels side is larger when the gear stage of the transmission is low than when it is high. For this reason, if the intake air amount increase control is implemented when the gear stage is a low-speed stage that is lower than the determination gear stage, a relatively large torque shock may occur as the engine torque increases when the fuel supply is resumed. In contrast, in the above configuration, the intake air amount increase control is implemented when the gear stage is a high-speed stage, and is prohibited when the gear stage is a low-speed stage. This makes it possible to prevent a large torque shock from occurring while ensuring opportunities to implement the intake air amount increase control, that is, opportunities to cool the catalyst device.

Preferably, in the configuration, in implementation of the intake air amount increase control, the control device controls the intake air amount adjustment device so that the intake air amount decreases as a gear stage of a transmission mounted on the vehicle becomes lower.

With this configuration, the increase amount of the engine torque is kept smaller as the gear stage is lower when a fuel cut accompanied by the intake air amount increase control ends and the fuel supply is resumed. This makes it possible to prevent a large torque shock from occurring when the gear stage is low, and to increase the cooling effect of the catalyst device when the gear stage is high.

Preferably, in this configuration, at a time of not implementing the fuel cut, the control device restricts the intake air amount to a predetermined upper limit intake air amount or less by the intake air amount adjustment device when the catalyst temperature is high.

With this configuration, when the fuel cut is not implemented and the catalyst temperature is high, the intake air amount is prevented from exceeding the upper limit intake air amount, and the combustion energy generated in the combustion chamber is kept small. This prevents the catalyst temperature from becoming excessively high. However, if opportunities to restrict the intake air amount increases, opportunities to restrict engine output increases, which may deteriorate driving performance of the vehicle. In contrast, in the present disclosure, since the catalyst device is cooled when the fuel cut is implemented as described above, the opportunities can be reduced in which the catalyst temperature becomes high when the fuel cut is not implemented. This makes it possible to prevent the catalyst temperature from overheating while preventing a deterioration in driving performance.

In the above configuration, a throttle valve that is provided in the intake passage, and opens and closes the intake passage can be used as the intake air amount adjustment device.

Advantageous Effect

As described above, the control system for an engine of the present disclosure can prevent the catalyst device from overheating while preventing the sense of deceleration from worsening.

DETAILED DESCRIPTION

Overall Configuration of Engine System

Figure 1:
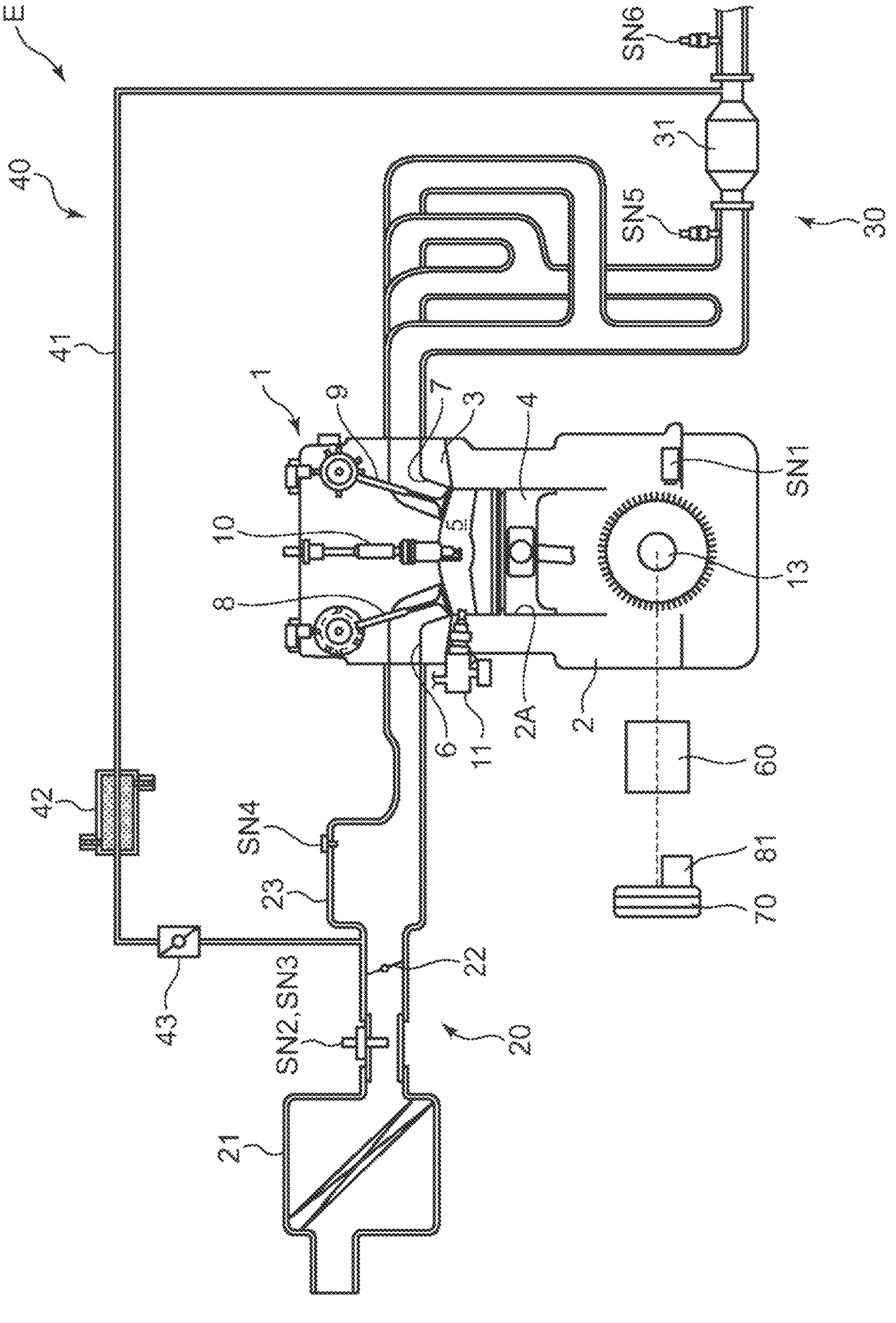
FIG. 1 is a schematic configuration diagram of an engine system according to an embodiment of the present disclosure.

FIG. 1 is a schematic configuration diagram showing a preferred embodiment of an engine system E to which a control system for an engine according to the present disclosure is applied. The engine system E includes an engine body 1 that is driven by receiving a supply of fuel, and an intake passage 20 and an exhaust passage 30 that are connected to the engine body 1. The intake passage 20 is a passage through which intake air, which is the air introduced into the engine body 1, flows. The exhaust passage 30 is a passage through which exhaust gas exhausted from the engine body 1 flows. The engine system E is mounted on a vehicle such as an automobile as a power source for driving the vehicle.

The engine body 1 is a multi-cylinder engine having a plurality of cylinders 2A (only one of which is shown in FIG. 1). In this embodiment, the engine body 1 is a four-cylinder in-line engine, and has four cylinders 2A aligned in a direction perpendicular to the paper surface of FIG. 1. The engine body 1 includes a cylinder block 2 having the plurality of cylinders 2A formed therein, a cylinder head 3 attached to the upper surface of the cylinder block 2 so as to close the upper end openings of the individual cylinders 2A, and a plurality of pistons 4 each housed in a cylinder 2A so as to be able to reciprocate and slide.

A combustion chamber 5 is defined above the piston 4 of each cylinder 2A. Fuel is supplied to the combustion chamber 5 as described below. The supplied air-fuel mixture is burned in the combustion chamber 5, and the piston 4 reciprocates in the up-down direction due to the expansion force caused by the combustion.

A crankshaft 13, which is the output shaft of the engine body 1, is provided at the lower part of the cylinder block 2 (below the piston 4). The crankshaft 13 is connected to the pistons 4 of the individual cylinders 2A via connecting rods. The crankshaft 13 rotates around its central axis in accordance with the reciprocating motion (up and down movement) of the pistons 4.

The vehicle including the engine system E includes a multi-speed transmission as a transmission 60. The transmission 60 is also an automatic transmission, and the transmission 60 and the crankshaft 13 are connected via a torque converter or the like. The output of the engine body 1 is transmitted to wheels 70 via the crankshaft 13, torque converter, transmission 60, and the like. In this embodiment, the transmission 60 is a six-speed multi-stage transmission, and forms forward gear stages that is six gear stages with different transmission gear ratios from each other.

A crank angle sensor SN1 is attached to the cylinder block 2. The crank angle sensor SN1 detects the crank angle, which is the rotation angle of the crankshaft 13, and the engine rotation speed, which is the rotation speed of the crankshaft 13.

In the cylinder head 3, each cylinder 2A includes an intake port 6 and an exhaust port 7 that communicate with the combustion chamber 5. In the cylinder head 3, each cylinder 2A includes an intake valve 8 for opening and closing the opening of the intake port 6 on the combustion chamber 5 side, and an exhaust valve 9 for opening and closing the opening of the exhaust port 7 on the combustion chamber 5 side.

In the cylinder head 3, each cylinder 2A is provided with one injector 11, which supplies fuel to the combustion chamber 5. The engine body 1 is a gasoline engine, and each injector 11 injects fuel containing gasoline into the combustion chamber 5. The injector 11 is a side-injection type fuel injection valve, and its head end faces the combustion chamber 5 from the inner peripheral surface of the combustion chamber 5. In the cylinder head 3, each cylinder 2A includes one spark plug 10, which ignites the air-fuel mixture in the combustion chamber 5. The spark plug 10 is disposed so that its head end, including a spark plug, faces the inside of the combustion chamber 5 from near the center of the ceiling surface of the combustion chamber 5.

The intake passage 20 is connected to the cylinder head 3 so as to communicate with the intake ports 6 of the individual cylinders 2A. In the intake passage 20, an air cleaner 21, a throttle valve 22, and a surge tank 23 are disposed in this order from the upstream side in the flow direction of the intake air.

The air cleaner 21 is a filter that removes foreign matter in the intake air. The throttle valve 22 is a valve that opens and closes the intake passage 20. The amount of intake air flowing through the intake passage 20, and therefore the amount of air drawn into the combustion chamber 5, changes in accordance with the opening degree of the throttle valve 22. The surge tank 23 is a tank that provides a space for evenly distributing intake air to each cylinder 2A. The throttle valve 22 is an example of an "intake air amount adjustment device" in the present disclosure.

An air flow sensor SN2, intake air temperature sensor SN3, and intake air pressure sensor SN4 are disposed in the intake passage 20. The air flow sensor SN2 detects the intake air amount, which is the amount of air drawn into the individual combustion chambers 5 through the intake passage 20. The intake air temperature sensor SN3 detects the intake air temperature, which is the temperature of the air flowing through the intake passage 20. The intake air pressure sensor SN4 detects the intake air pressure, which is the pressure inside the intake passage 20. The air flow sensor SN2 and the intake air temperature sensor SN3 are disposed in the vicinity of the air cleaner 21, and respectively detect the flow rate and temperature of air passing through the intake passage 20 in the vicinity of the air cleaner 21. The intake air pressure sensor SN4 is disposed in the surge tank 23 and detects the pressure inside the surge tank 23.

The exhaust passage 30 is connected to the cylinder head 3 so as to communicate with the exhaust ports 7 of the individual cylinders 2A. A catalyst device 31 is disposed in the exhaust passage 30. The catalyst device 31 is a device that includes a catalyst and purifies exhaust gas by using the action of the catalyst.

The catalyst device 31 has a built-in three-way catalyst. Thus, when an air-fuel ratio of the exhaust gas is at or close to the stoichiometric air-fuel ratio, the catalyst device 31 oxidizes HC (hydrocarbon) and CO (carbon monoxide) while reducing $NO_x$ (nitrogen oxides). Here, the three-way catalyst has a property of absorbing oxygen. Therefore, when a large amount of oxygen is contained in the exhaust gas, the catalyst device 31 absorbs oxygen. In a state in which the amount of absorbed oxygen is large, the catalyst device 31 cannot sufficiently reduce $NO_x$.

A front $O_2$ sensor SN5 and a rear $O_2$ sensor SN6 are disposed in the exhaust passage 30. The front $O_2$ sensor SN5 is attached to a part of the exhaust passage 30 upstream of the catalyst device 31 (in the direction of exhaust gas flow), and detects the oxygen concentration and air-fuel ratio of the exhaust gas passing through this part. The rear $O_2$ sensor SN6 is attached to a part of the exhaust passage 30 downstream of the catalyst device 31 (in the direction of the exhaust gas flow), and detects the air-fuel ratio of the exhaust gas passing through this part. The front $O_2$ sensor SN5 is a so-called linear $O_2$ sensor, and outputs a voltage proportional to the oxygen concentration and air-fuel ratio of the exhaust gas. In contrast, the rear $O_2$ sensor SN6 is a so-called $\lambda$ sensor, and the rear $O_2$ sensor SN6 determines which of the following three states the exhaust gas state is in: a state in which the air-fuel ratio is close to the stoichiometric air-fuel ratio, a state in which the air-fuel ratio is richer than the stoichiometric air-fuel ratio, or a state in which the air-fuel ratio is leaner than the stoichiometric air-fuel ratio.

Note that, in this embodiment, the exhaust passage 30 is a so-called 4-2-1 type exhaust passage. In other words, the exhaust passage 30 is configured such that four exhaust passages extending from the engine body 1 are merged into two, which are then merged into one on the downstream side (in the direction of the exhaust gas flow). The catalyst device 31, the front $O_2$ sensor SN5, and the rear $O_2$ sensor SN6 are all provided downstream of the part where the exhaust passages merge into one.

The engine system E is provided with an exhaust gas recirculation (EGR) device 40. The EGR device 40 includes EGR passage 41. The EGR passage 41 is a passage that connects the exhaust passage 30 and the intake passage 20, and recirculates EGR gas, which is a portion of the exhaust gas, to the intake passage 20. The EGR passage 41 connects a part of the exhaust passage 30 downstream of the catalyst device 31 (in the direction of the exhaust gas flow) to a part of the intake passage 20 between the throttle valve 22 and the surge tank 23.

The EGR passage 41 is provided with an EGR cooler 42 and an EGR valve 43. The EGR cooler 42 cools the EGR gas flowing through the EGR passage 41 through heat exchange. The EGR valve 43 is a valve that opens and closes the EGR passage 41. The amount of EGR gas recirculated to the intake passage 20 is changed in accordance with the opening degree of the EGR valve 43. The EGR valve 43 is provided in the EGR passage 41, closer to the intake passage 20 than the EGR cooler 42.

Control System

Figure 2:
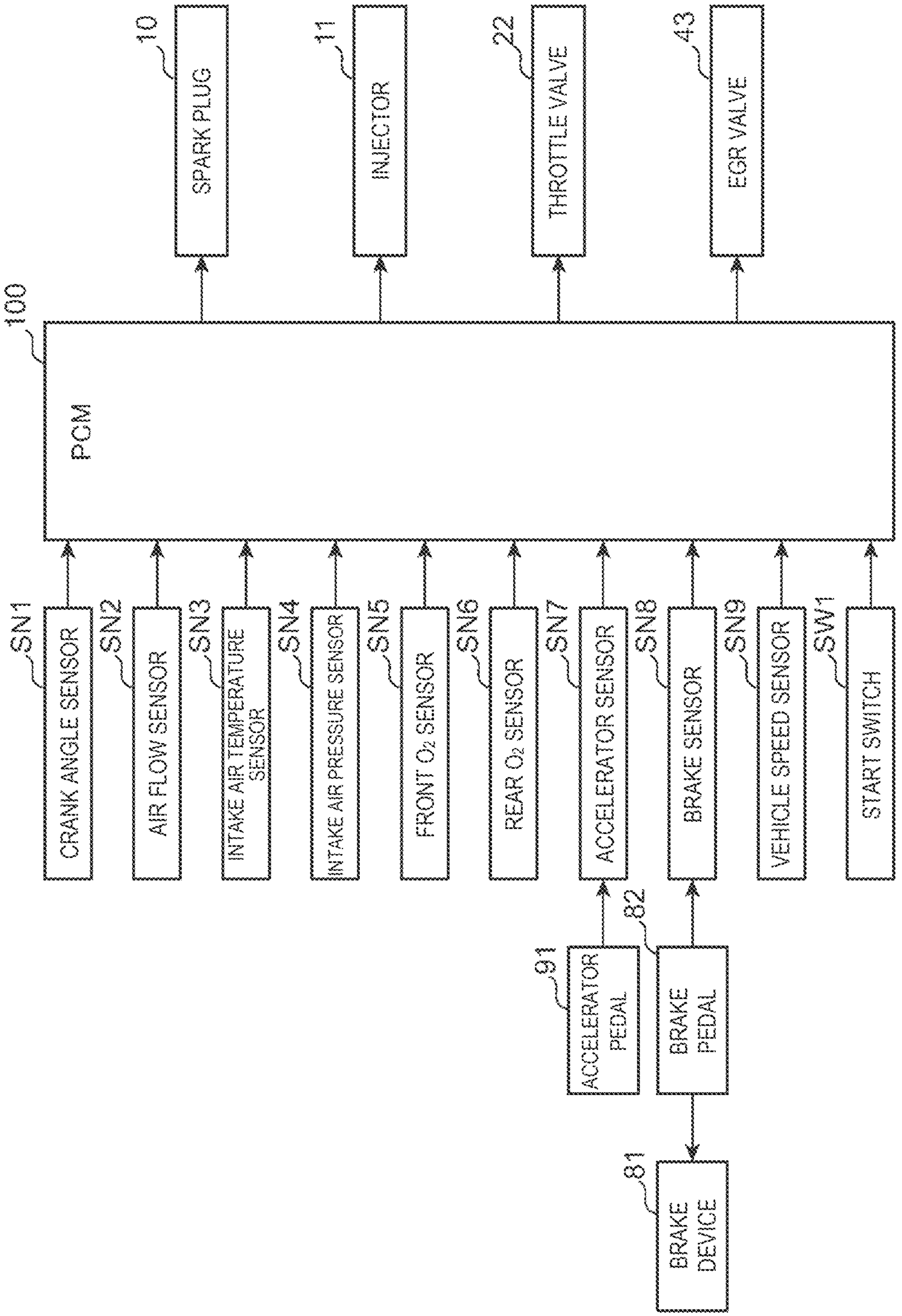
FIG. 2 is a diagram showing a control block of the engine system.

FIG. 2 is a functional block diagram showing the control system of the engine system E. A powertrain control module (PCM) 100 shown in this figure is a device that is mounted on a vehicle and provides overall control of the engine system E. The PCM 100 includes a microcomputer including a processor (e.g., a central processing unit (CPU)) that implements various calculation processes, memory such as ROM and RAM, and various input/output buses. The PCM 100 is an example of a "control device" in the present disclosure.

The PCM 100 is electrically connected to the crank angle sensor SN1, air flow sensor SN2, intake air temperature sensor SN3, intake air pressure sensor SN4, front $O_2$ sensor SN5, and rear $O_2$ sensor SN6. Information detected by sensors SN1 to SN6 is input one by one to the PCM 100.

The vehicle including the engine system E includes an accelerator pedal 91 that is depressed by the driver, and an accelerator sensor SN7. The accelerator pedal 91 is an operating device for changing and adjusting the output of the engine body 1 and therefore the vehicle speed. The accelerator sensor SN7 detects the accelerator opening degree, which is the amount of depression of the accelerator pedal 91, that is, the opening degree of the accelerator pedal 91. The accelerator opening degree is a parameter that is 0(%) when the accelerator pedal 91 is not depressed, and is 100(%) when the depression amount of the accelerator pedal 91 is at its maximum.

The vehicle includes a brake device 81, a brake pedal 82, and a brake sensor SN8. The brake device 81 is a device that applies a braking force to the wheels 70 to brake the wheels 70. The brake pedal 82 is an operating device for switching between driving and stopping the brake device 81 and for increasing and decreasing the braking force that the brake device 81 applies to the wheels 70. The brake pedal 82 is depressed by the driver. The brake sensor SN8 detects the brake opening degree that is the depression amount of the brake pedal 82, that is, the opening degree of the brake pedal 82; and the operating state of the brake device 81. The brake opening degree is a parameter that is 0(%) when the brake pedal 82 is not depressed, and is 100(%) when the depression amount of the brake pedal 82 is maximum.

The vehicle includes a vehicle speed sensor SN9 for detecting the vehicle speed. The vehicle is provided with a start switch SW1 that is operated by the driver to start the engine body 1. When a specified operation is performed on the start switch SW1, the start switch SW1 is switched to an IG_ON state (the ignition is turned on) and power is supplied to each part of the engine system E, making it possible to start the engine body 1. In addition, when a predetermined operation is performed on the start switch SW1 while in the IG_ON state, the start switch SW1 is switched to an IG_OFF state (the ignition is turned off), the power supply to each part of the engine system E is stopped, and the engine body 1 cannot be started.

Information detected by the accelerator sensor SN7 and brake sensor SN8, and a signal from the start switch SW1 are input one by one to the PCM 100.

The PCM 100 controls each part of the engine system E while executing various determinations and calculations based on input information from the sensors SN1 to SN9 and the start switch SW1. The PCM 100 is electrically connected to the spark plug 10, the injector 11, the throttle valve 22, the EGR valve 43, and the like, and outputs control signals to each of these devices based on the results of the above calculations, and the like.

Fuel Cut and Basic Control in Fuel Cut

When fuel cut conditions are met, that is, the engine rotation speed is higher than a predetermined idle rotation speed and the accelerator opening degree is equal to or less than a predetermined accelerator determination opening degree, the PCM 100 implements a fuel cut that stops the drive of the injector 11 of each cylinder 2A and stops fuel injection into each combustion chamber 5. The accelerator determination opening degree is set to 0 (zero), that is, an opening degree close to full closure, and the fuel cut is implemented when the accelerator is substantially off in which the accelerator pedal 91 is not depressed. While the fuel cut is implemented, except for when an intake air amount increase control described below is performed, the PCM 100 controls the throttle opening degree to a predetermined normal FC opening degree. The normal FC opening degree is preset to an opening degree that is close to 0 (zero), that is, to full closure, and an opening degree that is smaller (on the closure side) than the throttle opening degree to be achieved when the fuel cut is not implemented. While the fuel cut is implemented, except for when an EGR valve failure diagnosis described below is performed, the PCM 100 fully closes the EGR valve 43.

Catalyst Protection Control

The following describes the catalyst protection control implemented by the PCM 100 to prevent overheating of the catalyst device 31.

Catalyst Temperature Condition

Figure 3:
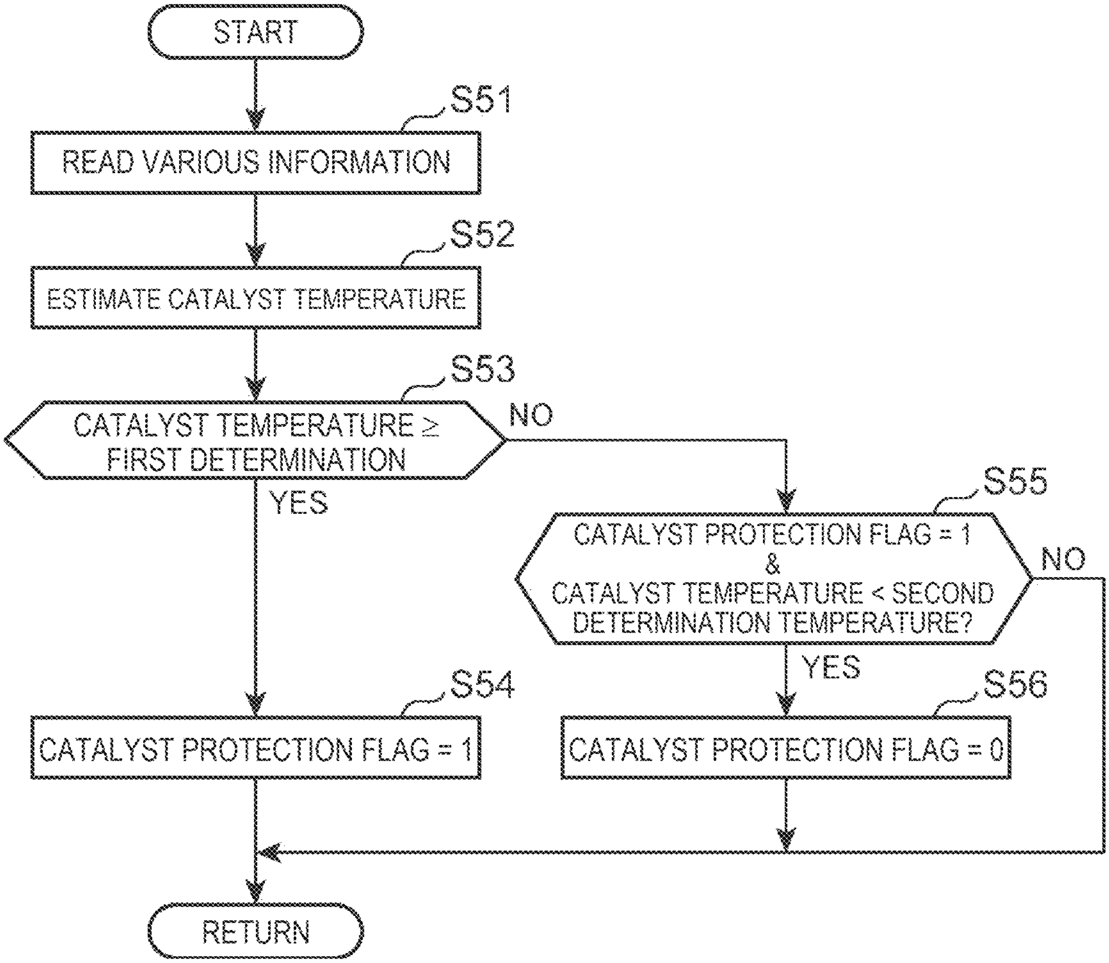
FIG. 3 is a flowchart showing a procedure for setting a catalyst protection flag.

FIG. 3 is a flowchart showing the procedure for calculating the catalyst protection flag. The catalyst protection control is implemented when the catalyst temperature, which is the temperature of the catalyst device 31, is high. Specifically, the catalyst protection control is implemented when the catalyst temperature is equal to or higher than the first determination temperature, and when the catalyst temperature has reached or exceeded the first determination temperature but has not yet decreased below the second determination temperature. The catalyst protection flag is a flag that indicates whether the condition for implementing this catalyst protection control is met.

Steps S51 to S56 shown in FIG. 3 are repeatedly implemented at predetermined intervals while in the IG_ON state. First, the PCM 100 reads various information including the detection values of the sensors SN1 to SN9 (step S51). In step S51, the PCM 100 reads at least the intake air amount detected by the air flow sensor SN2, the engine rotation speed detected by the crank angle sensor SN1, and the intake air temperature detected by the intake air temperature sensor SN3. Next, the PCM 100 estimates the catalyst temperature, which is the temperature of the catalyst device 31 (step S52). Specifically, the PCM 100 estimates the temperature of the exhaust gas based on the intake air amount, engine rotation speed, intake air temperature, the amount of fuel injected from the injector 11, and the like, and estimates the catalyst temperature based on the estimated exhaust gas temperature. In this embodiment, the PCM 100 obtains the catalyst temperature in this way Next, the PCM 100 determines whether the catalyst temperature estimated in step S52 is equal to or higher than the first determination temperature (step S53). The first determination temperature is preset and stored in the PCM 100. The first determination temperature is set to, for example, about 900° C. If the determination in step S53 is YES and the catalyst temperature is equal to or higher than the first determination temperature, the PCM 100 sets the catalyst protection flag to 1 (step S54).

Contrarily, if the determination in step S53 is NO and the catalyst temperature is less than the first determination temperature, the PCM 100 determines whether the condition is met that the catalyst protection flag is 1 and the catalyst temperature is less than the second determination temperature (step S55). If the determination in step S55 is NO and the catalyst protection flag is 0, or the catalyst temperature is equal to or higher than the second determination temperature, the PCM 100 ends the process (returns to step S51). In other words, the PCM 100 maintains the value of the catalyst protection flag at the current value. Contrarily, if the determination in step S55 is YES, the catalyst protection flag is 1, and the catalyst temperature is less than the second determination temperature, that is, if the catalyst temperature has reached or exceeded the first determination temperature to set the catalyst protection flag to 1, and then the catalyst temperature has decreased to less than the second determination temperature, the PCM 100 sets the catalyst protection flag to 0 (step S56) and ends the process (returns to step S51).

In this way, if the catalyst temperature is equal to or higher than the first determination temperature or the catalyst temperature has reached or exceeded the first determination temperature and has not yet decreased below the second determination temperature, and the condition for implementing the catalyst protection control is met, the catalyst protection flag is set to 1. In addition, at other times when the condition for implementing the catalyst protection control is not met, the catalyst protection flag is set to 0. The catalyst protection flag is set to 0 when in the IG_OFF state.

Fuel Cut Control

Figure 4:
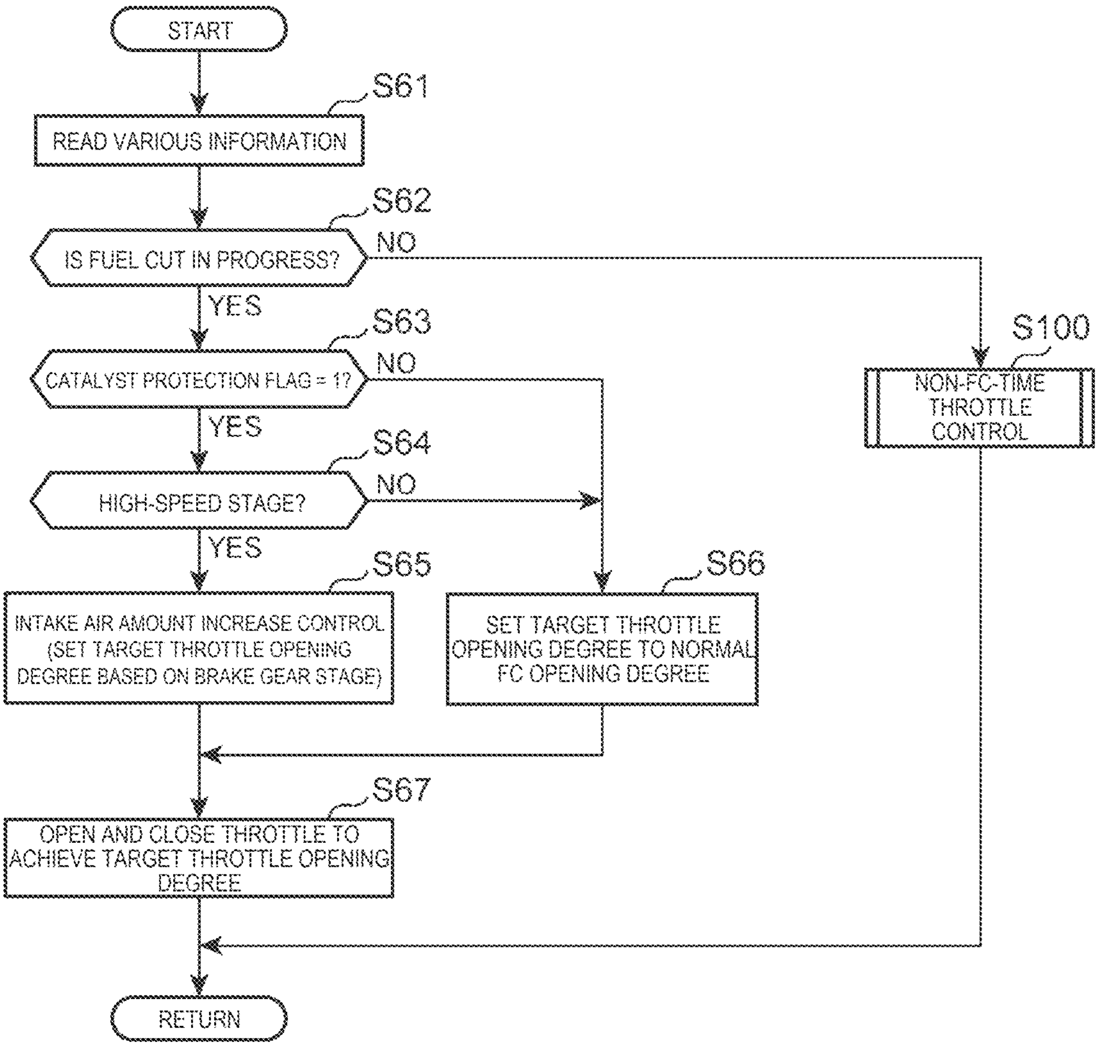
FIG. 4 is a flowchart showing contents of a control implemented by a powertrain control module (PCM).

FIG. 4 is a flowchart showing the control implemented by the PCM 100 mainly in the fuel cut. Steps from S61 shown in FIG. 4 are repeatedly implemented at predetermined intervals while in the IG_ON state.

First, the PCM 100 reads various information including the detection values of sensors SN1 to SN9 (step S61). In step S61, the PCM 100 reads at least the engine rotation speed detected by the crank angle sensor SN1, the accelerator opening degree detected by the accelerator sensor SN7, the brake opening degree detected by the brake sensor SN8, and the vehicle speed detected by the vehicle speed sensor SN9.

Next, the PCM 100 determines whether the fuel cut is in progress (step S62). Specifically, the PCM 100 determines whether the above-described fuel cut condition is met and fuel injection from the injectors 11 of all the cylinders 2A has stopped.

If the determination in step S62 is NO and the fuel cut is not in progress, the PCM 100 implements a non-FC-time throttle control (step S100). The non-FC-time throttle control is a control of the throttle valve 22 that is implemented in normal operation that is not the fuel cut. The non-FC-time throttle control will be described below. After implementing step S100, the PCM 100 ends the process (returns to step S61).

If the determination in step S62 is YES and the fuel cut is in progress, the PCM 100 determines whether the catalyst protection flag is 1 (step S63). Step S63 implements a determination using a catalyst protection flag calculated separately based on the catalyst temperature as described above.

If the determination in step S63 is NO and the catalyst protection flag is 0, the PCM 100 proceeds to step S66. In step S66, the PCM 100 sets the target throttle opening degree that is the target value of the throttle opening degree to the normal FC opening degree. As described above, the normal FC opening degree is preset to an opening degree close to full closure. After step S66, the PCM 100 proceeds to step S67.

If the determination in step S63 is YES and the catalyst protection flag is 1, the PCM 100 determines whether the gear stage is a high-speed stage that is equal to or higher than a determination gear stage (step S64). In this embodiment, the determination gear stage is set to the fifth gear, and the PCM 100 determines whether the current gear stage is fifth gear or sixth gear. The PCM 100 obtains the current gear stage based on the vehicle speed and the engine rotation speed, and uses this to make a determination in step S64.

If the determination in step S64 is NO and the gear stage is not a high-speed stage, that is, if the gear stage is any of the first to fourth gear stages, the PCM 100 proceeds to step S66, sets the target throttle opening degree to the normal FC opening degree, and then proceeds to step S67. Contrarily, if the determination in step S64 is YES and the gear stage is a high-speed stage, the PCM 100 proceeds to step S65, and implements the intake air amount increase control that is one example of the catalyst protection control.

The intake air amount increase control is a control for increasing the intake air amount that is the amount of air drawn into the combustion chamber 5. In step S65, the PCM 100 sets the target throttle opening degree to an opening degree larger (more open) than the normal FC opening degree. In steps S69 and S71, which will be described below, the throttle valve 22 is opened and closed so as to achieve the target throttle opening degree. Therefore, when the intake air amount increase control is implemented, the intake air amount is increased compared to when the intake air amount increase control is not implemented (when step S66 is implemented).

In step S65, PCM 100 sets the target throttle opening degree within a range that is larger than the normal FC opening degree, based on the brake opening degree and gear stage.

Specifically, in step S65, the PCM 100 sets the target throttle opening degree so that the target throttle opening degree when the brake opening degree is equal to or higher than a predetermined brake pedal determination opening degree is larger than the target throttle opening degree when the brake opening degree is less than the brake pedal determination opening degree. The brake pedal determination opening degree is set to a value close to 0 (zero), which is a brake opening degree that is the boundary between operation and non-operation of the brake device 81. As a result, when the brake opening degree is equal to or larger than the brake pedal determination opening degree, the brake device 81 operates to apply a braking force to the wheels 70. Contrarily, if the brake opening degree is less than the brake pedal determination opening degree, the brake device 81 does not operate and does not apply a braking force to the wheels 70.

Furthermore, in step S65, the PCM 100 sets the target throttle opening degree so that the opening degree increases as the gear stage is higher. In this embodiment, the PCM 100 sets the target throttle opening degree so that the target throttle opening degree when the gear stage is in the sixth gear is larger than the target throttle opening degree when the gear is in fifth gear. Note that with the same gear stage, the target throttle opening degree is set so as to be larger when the brake opening degree is equal to or larger than the brake pedal determination opening degree than when it is less than the brake pedal determination opening degree; and with the same brake opening degree, the target throttle opening degree is set so as to be larger when the gear stage is higher than when it is lower.

Figure 5:
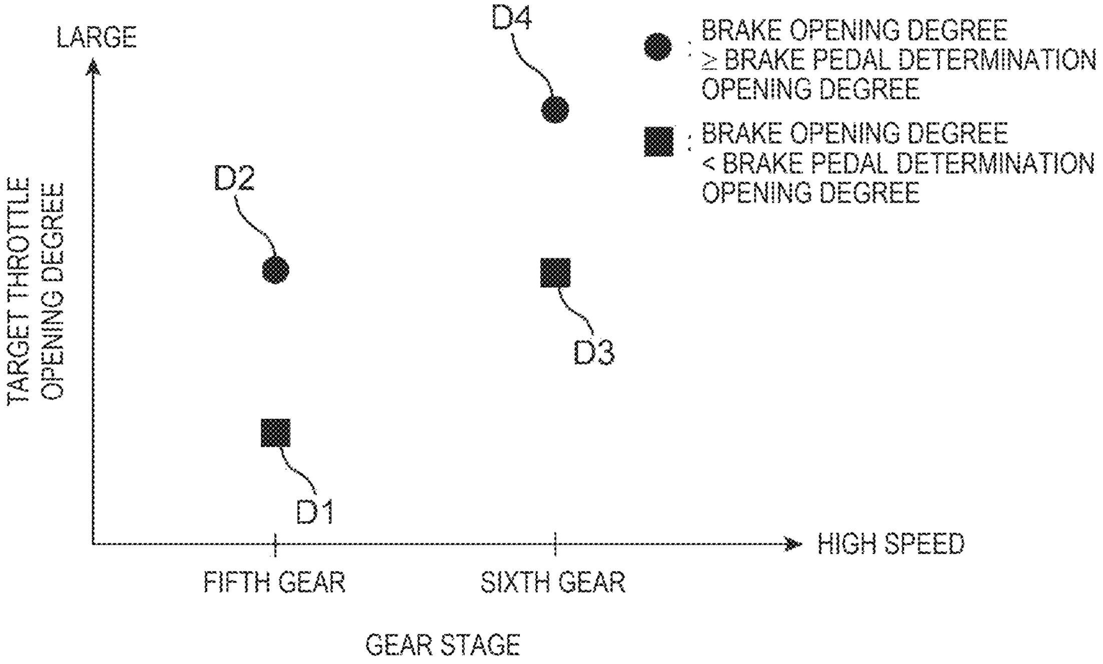
FIG. 5 is a graph showing a relationship between gear stages and brake opening degrees, and the target throttle opening degrees.

The target throttle opening degree in step S65 is set using the gear stage calculated based on the engine rotation speed and vehicle speed, the brake opening degree detected by the brake sensor SN8, and the brake pedal determination opening degree that is preset and stored in PCM 100. In this embodiment, as shown in FIG. 5, the following target throttle opening degrees are each set larger than the normal FC opening degree, and are preset so as to have the above-described relationship and stored in the PCM 100: a target throttle opening degree D1 when the gear stage is in the fifth gear and the brake opening degree is less than the brake pedal determination opening degree, a target throttle opening degree D2 when the gear stage is in the fifth gear and the brake opening degree is equal to or larger than the brake pedal determination opening degree, a target throttle opening degree D3 when the gear stage is in the sixth gear and the brake opening degree is less than the brake pedal determination opening degree, and a target throttle opening degree D4 when the gear stage is in the sixth gear and the brake opening degree is equal to or larger than the brake pedal determination opening degree. PCM 100 extracts the value that matches the current conditions from these four stored opening degrees (D1, D2, D3, D4) and sets the target throttle opening degree to the value.

In step S67, the PCM 100 opens and closes the throttle valve 22 so that the opening degree of the throttle valve 22 becomes the target throttle opening degree set in step S65 or step S66. For example, the PCM 100 obtains the current opening degree of the throttle valve 22 based on the drive current of the throttle valve 22, the output of the throttle valve opening degree sensor that can detects the opening degree of the throttle valve 22, and the like, and drives the throttle valve 22 based on the current opening degree of the throttle valve 22 and a target throttle opening degree. After step S67, the PCM 100 ends the process (returns to step S61).

As described above, during the fuel cut (determination in step S62 is YES), if the catalyst protection flag is 1 (the determination in step S63 is YES) and the gear stage is a high-speed stage (the determination in step S64 is YES), the intake air amount increase control is implemented and the throttle opening degree is set to a larger opening degree than the normal FC opening degree. As a result, the intake air amount is increased more than when the catalyst protection flag is 0 (the determination in step S63 is NO) or the gear stage is a low-speed stage (the determination in step S64 is NO). In addition, when the intake air amount increase control is implemented, the throttle opening degree is made larger to increase the intake air amount when the brake device 81 is in operation than when it is in non-operation, and the throttle opening degree is made larger to increase the intake air amount as the gear stage is higher.

Non-FC-Time Throttle Control

Figure 6:
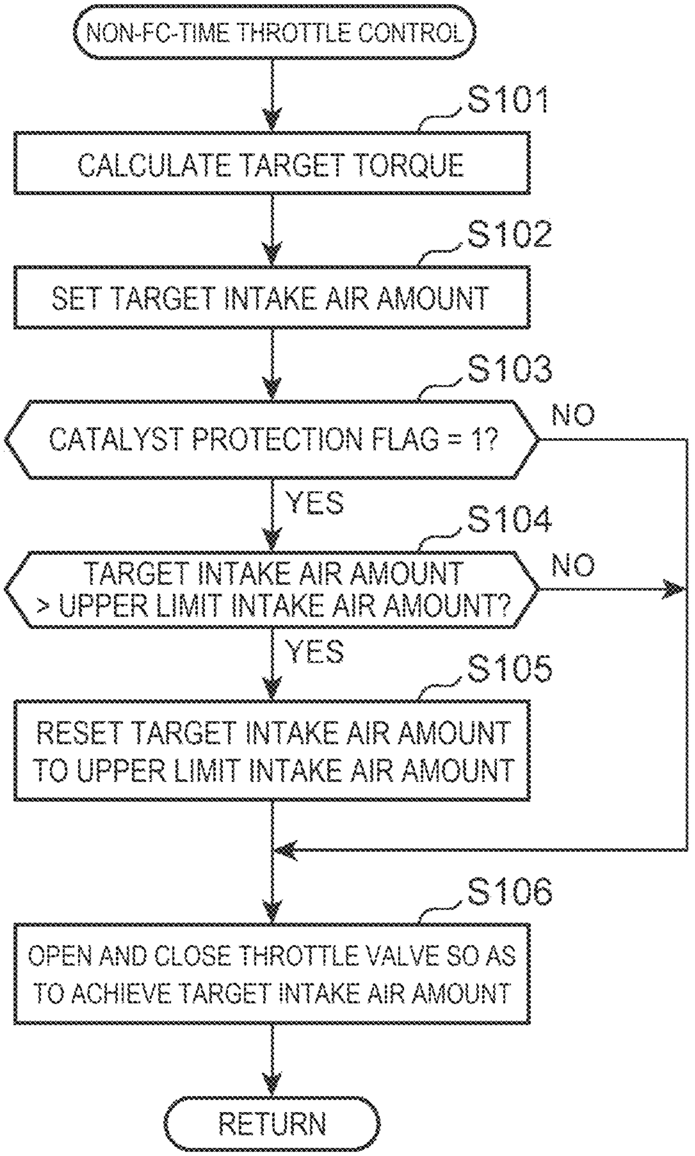
FIG. 6 is a flowchart showing contents of non-FC-time throttle control.

Next, the non-FC-time throttle control of step S100 will be described using the flowchart in FIG. 6.

When the non-FC-time throttle control is started, the PCM 100 first calculates a target torque that is a target value for the engine torque (step S101). The PCM 100 calculates the target torque based on the accelerator opening degree detected by the accelerator sensor SN7 and the vehicle speed detected by the vehicle speed sensor SN9, and the like.

Next, the PCM 100 sets a target intake air amount that is a target value of the intake air amount (step S102). PCM 100 sets the target intake air amount based on the target torque and the engine rotation speed detected by crank angle sensor SN1, and the like.

Next, the PCM 100 determines whether the catalyst protection flag is 1 (step S103). If the determination in step S103 is YES and the catalyst protection flag is 1, the PCM 100 determines whether the target intake air amount set in step S102 is larger than the upper limit intake air amount (step S104). The upper limit intake air amount is preset and stored in the PCM 100. If the determination in step S104 is YES and the target intake air amount is larger than the upper limit intake air amount, the PCM 100 resets the target intake air amount to the upper limit intake air amount (step S105). In other words, the target intake air amount is changed from the value set in step S102 to the upper limit intake air amount. After step S105, the PCM 100 proceeds to step S106.

Contrarily, if the determination in step S103 is NO and the catalyst protection flag is 0, or if the target intake air amount set in step S102 is equal to or smaller than the upper limit intake air amount, the PCM 100 proceeds to step S106 without implementing step S105, that is, while maintaining the target intake air amount at the value set in step S102.

In step S106, the PCM 100 opens and closes the throttle valve 22 so as to achieve the target intake air amount set in step S102, or the target intake air amount reset to the upper limit intake air amount in step S105. With the implementation of step S106, the non-FC-time throttle control ends.

As described above, when the fuel cut is not being implemented and the catalyst protection flag is 1, the PCM 100 implements a control to restrict the target intake air amount, and therefore the intake air amount, to below the upper limit intake air amount, as a part of the catalyst protection control.

Operation and Effects

Figure 7:
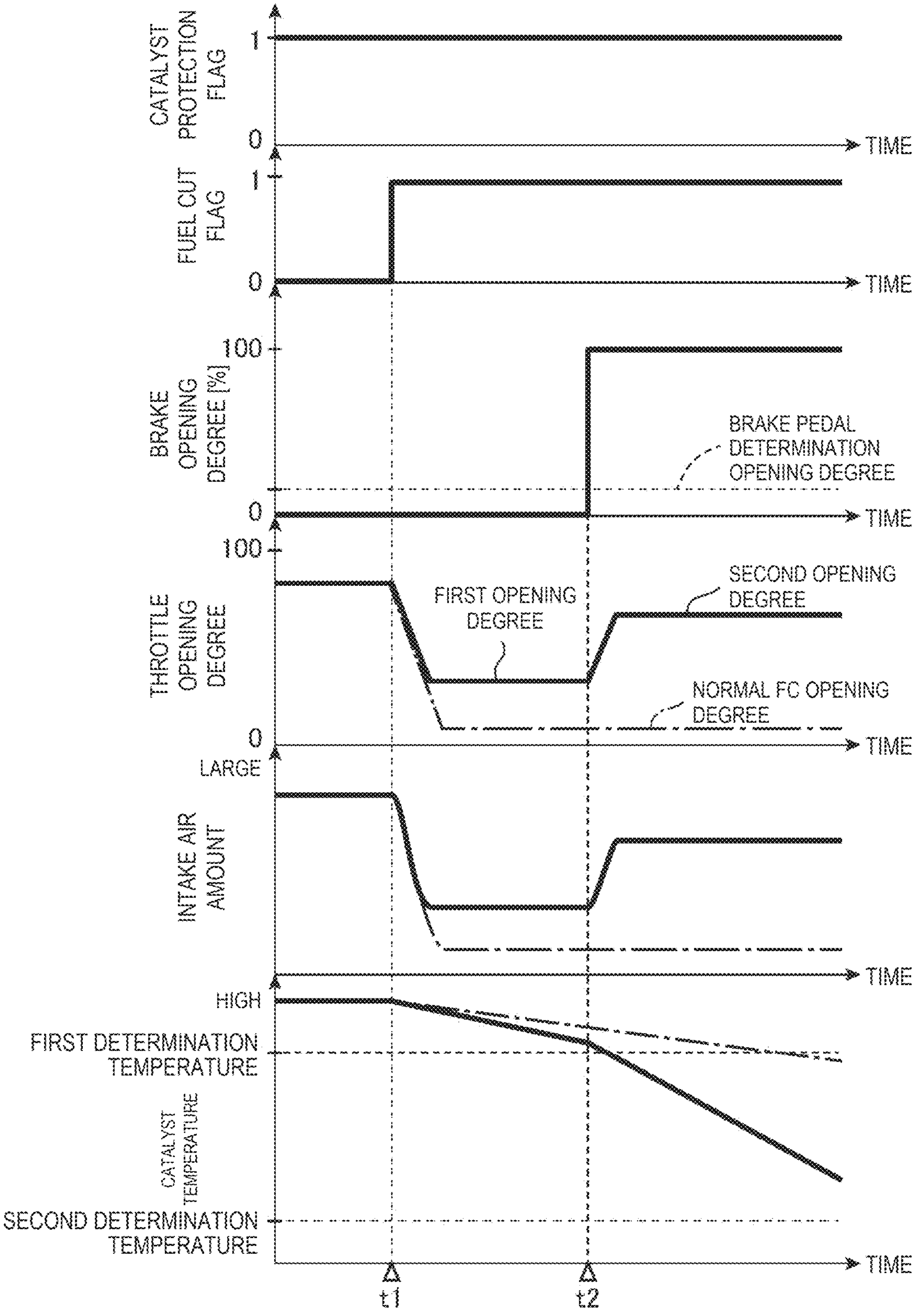
FIG. 7 is a time chart showing a time change of each parameter in a fuel cut.

FIG. 7 is a time chart that schematically shows the time change (solid lines) of each parameter according to the above embodiment when the fuel cut starts with the catalyst temperature equal to or higher than the first determination temperature. In addition, FIG. 7 is an example in which the vehicle is driven while the gear stage is a high-speed stage. FIG. 7 shows, from top to bottom, charts of the catalyst protection flag, the fuel cut flag, the brake opening degree, the throttle opening degree, the intake air amount, and the catalyst temperature. The fuel cut flag is a flag that is set to 1 when the fuel cut is implemented and set to 0 otherwise. In the charts of the throttle opening degree, the intake air amount, and the catalyst temperature in FIG. 7, chain lines indicate the throttle opening degree and the intake air amount according to a comparative example, and the chain lines indicates the throttle opening degree and intake air amount when the throttle opening degree after the fuel cut is assumed to be the opening degree when the catalyst protection flag is 0, that is, the normal FC opening degree.

In the example of FIG. 7, while the catalyst protection flag is 1 as the catalyst temperature is higher than the first determination temperature, the fuel cut is started at time t1. In the above embodiment, when the fuel cut starts, the throttle opening degree is controlled so as to be larger (more open) than the normal FC opening degree. Hereinafter and in FIG. 7, this opening degree is represented as a first opening degree. As described above, the throttle opening degree at this time is set based on the gear stage and the brake opening degree. Since the throttle opening degree is controlled to the first opening degree that is larger than the normal FC opening degree, the intake air amount during the fuel cut, and therefore the amount of air flowing into the catalyst device 31, is larger in the above embodiment than in the comparative example. Therefore, in the above embodiment, the catalyst device 31 is cooled more by a large amount of air, and the catalyst temperature decreases more quickly after the start of the fuel cut than in the comparative example in which the throttle opening degree is the normal FC opening degree.

In the example of FIG. 7, until time t2, the brake opening degree is 0 (zero) and the brake device 81 is in non-operation. In contrast, from time t2 onward, the brake pedal 82 is depressed, the brake opening degree becomes equal to or larger than the brake pedal determination opening degree, and the brake device 81 operates. As a result of the brake device 81 switching from a non-operation state to an operation state, at time t2, the target throttle opening degree is set to an opening degree larger than the first opening degree (hereinafter and in FIG. 6, this opening degree is represented as a second opening degree). In accordance with this, from time t2 onward, the throttle valve 22 is controlled to be more open and the opening degree thereof becomes the second opening degree. Since the throttle valve 22 is controlled to be more open, the intake air amount increases from time t2 onward. As a result, in the above embodiment, cooling of the catalyst device 31 is promoted from time t2 onward, and the catalyst temperature decreases more quickly.

In this way, in the above embodiment, the throttle opening degree and therefore the intake air amount in the fuel cut is made larger when the catalyst protection flag is 1 and the catalyst temperature is high than when the catalyst protection flag is 0 and the catalyst temperature is low. Therefore, according to the above embodiment, the timing of the fuel cut is used to allow the catalyst device 31, which has had a high temperature, to be cooled by a large amount of air, thereby decreasing the temperature of the catalyst device 31 early. As described above, the time when the catalyst protection flag is 1 and the catalyst temperature is high means the time when the catalyst temperature is equal to or higher than the first determination temperature, or that the catalyst temperature has once reached or exceeded the first determination temperature but has not yet decreased below the second determination temperature. The time when the catalyst flag is 0 and the catalyst temperature is low means the time when the catalyst temperature is below the second determination temperature, or that the catalyst temperature has been equal to or higher than the second determination temperature but has not reached the first determination temperature.

Here, if the intake air amount is simply increased during the fuel cut, the pumping loss reduces to slow the reduction rate of the engine rotation speed, and a sense of deceleration may worsen. In contrast, in the above embodiment, when the brake device 81 is in non-operation, the throttle opening degree is reduced to maintain the increase amount of the intake air small. Therefore, when the brake device 81 is in non-operation and the sense of deceleration by the brake device 81 is not ensured, it is possible to prevent the pumping loss from being excessively small, and to prevent the sense of deceleration from worsening. On the other hand, when the brake device 81 is in operation and the sense of deceleration by the brake device 81 can be ensured, the throttle opening degree is increased and the intake air amount is increased sufficiently, so that the catalyst device 31 can be reliably cooled by a large amount of air.

In addition, if the intake air amount is increased during the fuel cut, the air in the combustion chamber 5 is likely to be significant when the fuel injection is resumed, which causes a large increase amount in engine torque. Here, the influence of engine torque fluctuations on the wheels 70 is larger when the gear stage of the transmission 60 is low than when the gear stage is high. For this reason, if the intake air amount increase control is implemented when the gear stage is a low-speed stage, a relatively large torque shock may occur as the engine torque increases when the fuel injection is resumed. In contrast, in the above embodiment, the intake air amount increase control is implemented only when the gear stage is a high-speed stage. In other words, the intake air amount increase control is prohibited when the gear stage is a low-speed stage. Therefore, according to the above embodiment, it is possible to cool the catalyst device 31 by using the opportunities in which the gear stage is a high-speed stage while preventing a large torque shock from occurring with the implementation of the intake air amount increase control. In other words, a ride comfort of the vehicle can be improved while protecting the catalyst device 31.

Moreover, in the above embodiment, as the gear stage is higher, the throttle opening degree is increased and the intake air amount is increased. In other words, as the gear stage is lower, the throttle opening degree is reduced, and the increase amount of the intake air amount is maintained small. This makes it possible to prevent a large torque shock from occurring when the fuel gear stage is low, and to increase the cooling effect of the catalyst device when the gear stage is high.

In addition, in the above embodiment, when the catalyst protection flag is 1 and the catalyst temperature is high, the intake air amount is prevented from exceeding the upper limit intake air amount while the fuel cut is not being implemented, allowing the combustion energy generated in the combustion chamber to be maintained small. This makes it possible to more reliably prevent the catalyst temperature from becoming excessively high.

However, if opportunities to restrict the intake air amount increases, opportunities to restrict engine output increases, which may deteriorate driving performance of the vehicle. For this, in the above embodiment, the catalyst device 31 is cooled when the fuel cut is implemented to prevent the temperature from rising excessively. This makes it possible to reduce the opportunities for the catalyst temperature to become high when the fuel cut is not implemented, and prevent a deterioration in driving performance.

Modified Example

The above embodiment is described with the case in which increasing and decreasing the opening degree of the throttle valve 22 increases and decreases the intake air amount when the intake air amount increase control is implemented and when the control for restricting the intake air amount to an upper limit intake air amount is implemented, but the device for increasing and decreasing the intake air amount is not limited to the throttle valve 22. For example, a variable valve mechanism capable of changing the opening and closing timings of the intake valve 8 may be provided in the device that drives the intake valve 8 to increase and decrease the intake air amount by changing the opening and closing timings of the intake valve 8.

The above embodiment is described with the case in which the catalyst protection control (intake air amount increase control and control to restrict the intake air amount to an upper limit intake air amount) is implemented when the catalyst temperature is equal to or higher than the first determination temperature, and when the catalyst temperature has reached or exceeded the first determination temperature but has not yet decreased below the second determination temperature, but the condition that the catalyst temperature has reached or exceeded the first determination temperature but has not yet decreased below the second determination temperature may be excluded from the conditions for implementing the catalyst protection control.

In the above embodiment, a case has been described in which the intake air amount increase control is implemented only when the gear stage is a high-speed stage, but the intake air amount increase control may be implemented as the fuel cut is in progress and the catalyst protection flag is 1, regardless of whether the gear stage is a high-speed stage or a low-speed stage. Also when the intake air amount increase control is implemented, the target throttle opening degree may be set regardless of the gear stage.

The above embodiment is described with the case in which the catalyst device 31 includes a three-way catalyst as a catalyst, but the catalyst included in the catalyst device 31 is not limited to this. In addition, the above embodiment is described with the case in which the injector 11 is a side-injection type, but the injection type of the injector 11 is not limited to this. In addition, the description is made on the case in which the fuel is directly injected into the combustion chamber 5, but the injection form of the fuel is not limited to this. In addition, the specific structure of the engine body 1, such as the number of cylinders, is not limited to the above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

1 engine body
5 combustion chamber
11 injector
22 throttle valve (intake air amount adjustment device)
30 exhaust passage
31 catalyst device
60 transmission
81 brake device
100 powertrain control module (PCM) (control device)
SN7 accelerator sensor
SN8 brake sensor

The invention claimed is:

1. A control system for an engine provided in a vehicle including a brake device for braking a wheel and an accelerator pedal for adjusting a vehicle speed, the control system comprising:
- an engine body including a combustion chamber;
- an exhaust passage and an intake passage each connected to the engine body;
- an injector that supplies fuel to the combustion chamber;
- an intake air amount adjustment device that adjusts an intake air amount that is an amount of air drawn into the combustion chamber;
- a catalyst device provided in the exhaust passage to purify exhaust gas;
- an accelerator sensor that detects an accelerator opening degree, the accelerator opening degree being an opening degree of the accelerator pedal;
- a brake sensor that detects an operation state of the brake device; and
- a control device that controls the injector and the intake air amount adjustment device, the control device being configured to:
  - estimate a catalyst temperature that is a temperature of the catalyst device;
  - implement a fuel cut to stop fuel injection by the injector when the accelerator opening degree detected by the accelerator sensor is less than a predetermined accelerator determination opening degree;
  - in implementation of the fuel cut, implement an intake air amount increase control when the catalyst temperature is high to control the intake air amount adjustment device so that the intake air amount is larger than when a catalyst temperature is low; and
  - in implementation of the intake air amount increase control, control the intake air amount adjustment device when the brake sensor detects that the brake device is in operation so that the intake air amount is larger than when the brake sensor detects that the brake device is not in operation.

2. The control system according to claim 1, wherein the control device implements the intake air amount increase control when a gear stage of a multi-speed transmission mounted on the vehicle is a high-speed stage that is equal to or greater than a predetermined determination gear stage, and the control device prohibits the intake air amount increase control when the gear stage is a low-speed stage that is lower than the determination gear stage.

3. The control system according to claim 1, wherein in implementation of the intake air amount increase control, the control device controls the intake air amount adjustment device so that the intake air amount decreases as a gear stage of a transmission mounted on the vehicle is lower.

4. The control system according to claim 1, wherein in non-implementation of the fuel cut, the control device restricts the intake air amount to a predetermined upper limit intake air amount or less by the intake air amount adjustment device when the catalyst temperature is high.

5. The control system according to claim 1, wherein the intake air amount adjustment device is a throttle valve that is provided in the intake passage, and opens and closes the intake passage.

6. The control system according to claim 2, wherein the intake air amount adjustment device is a throttle valve that is provided in the intake passage, and opens and closes the intake passage.

7. The control system according to claim 3, wherein the intake air amount adjustment device is a throttle valve that is provided in the intake passage, and opens and closes the intake passage.

8. The control system according to claim 4, wherein the intake air amount adjustment device is a throttle valve that is provided in the intake passage, and opens and closes the intake passage.

9. A control device for an engine provided in a vehicle including a brake device for braking a wheel and an accelerator pedal for adjusting a vehicle speed, the control device comprising:
- memory and a processor configured to control an injector that supplies fuel to a combustion chamber of an engine body and control an intake air amount adjustment device that adjust an intake air amount that is an amount of air drawn into the combustion chamber, the control device being configured to:
  - estimate a catalyst temperature that is a temperature of a catalyst device provided in an exhaust passage connected to the engine body to purify exhaust gas;
  - implement a fuel cut to stop fuel injection by the injector when an accelerator opening degree detected by an accelerator sensor that detects the accelerator opening degree, the accelerator opening degree being an opening degree of the accelerator pedal, is less than a predetermined accelerator determination opening degree;
  - in implementation of the fuel cut, implement an intake air amount increase control when the catalyst temperature is high to control the intake air amount adjustment device so that the intake air amount is larger than when a catalyst temperature is low; and
  - in implementation of the intake air amount increase control, control the intake air amount adjustment device when a brake sensor detects that a brake device is in operation so that the intake air amount is larger than when the brake sensor detects that the brake device is not in operation.

10. The control device according to claim 9, wherein the control device implements the intake air amount increase control when a gear stage of a multi-speed transmission mounted on the vehicle is a high-speed stage that is equal to or greater than a predetermined determination gear stage, and the control device prohibits the intake air amount increase control when the gear stage is a low-speed stage that is lower than the determination gear stage.

11. The control device according to claim 9, wherein in implementation of the intake air amount increase control, the control device controls the intake air amount adjustment device so that the intake air amount decreases as a gear stage of a transmission mounted on the vehicle is lower.

12. The control device according to claim 9, wherein in non-implementation of the fuel cut, the control device restricts the intake air amount to a predetermined upper limit intake air amount or less by the intake air amount adjustment device when the catalyst temperature is high.

13. The control device according to claim 9, wherein the intake air amount adjustment device is a throttle valve that is provided in the intake passage, and opens and closes the intake passage.

14. A control method for an engine provided in a vehicle including a brake device for braking a wheel, an accelerator pedal for adjusting a vehicle speed, an engine body including a combustion chamber, an exhaust passage and an intake passage each connected to the engine body, an injector that supplies fuel to the combustion chamber, an intake air amount adjustment device that adjusts an intake air amount that is an amount of air drawn into the combustion chamber, a catalyst device provided in the exhaust passage to purify exhaust gas, an accelerator sensor that detects an accelerator opening degree, the accelerator opening degree being an opening degree of the accelerator pedal, a brake sensor that detects an operation state of the brake device, and a control device that controls the injector and the intake air amount adjustment device, the control method comprising:

estimating a catalyst temperature that is a temperature of the catalyst device;

implementing a fuel cut to stop fuel injection by the injector when the accelerator opening degree detected by the accelerator sensor is less than a predetermined accelerator determination opening degree;

in implementation of the fuel cut, implementing an intake air amount increase control when the catalyst temperature is high to control the intake air amount adjustment device so that the intake air amount is larger than when a catalyst temperature is low; and in implementation of the intake air amount increase control, controlling the intake air amount adjustment device when the brake sensor detects that the brake device is in operation so that the intake air amount is larger than when the brake sensor detects that the brake device is not in operation.

15. The control method according to claim 14, wherein the intake air amount increase control is implemented when a gear stage of a multi-speed transmission mounted on the vehicle is a high-speed stage that is equal to or greater than a predetermined determination gear stage, and the intake air amount increase control is prohibited when the gear stage is a low-speed stage that is lower than the determination gear stage.

16. The control method according to claim 14, wherein in implementation of the intake air amount increase control, the control method controls the intake air amount adjustment device so that the intake air amount decreases as a gear stage of a transmission mounted on the vehicle is lower.

17. The control method according to claim 14, wherein in non-implementation of the fuel cut, the control method restricts the intake air amount to a predetermined upper limit intake air amount or less by the intake air amount adjustment device when the catalyst temperature is high.

18. The control method according to claim 14, wherein the intake air amount adjustment device is a throttle valve that is provided in the intake passage, and opens and closes the intake passage.

* * * * *